US012035420B2

United States Patent
Cataquis et al.

(10) Patent No.: US 12,035,420 B2
(45) Date of Patent: Jul. 9, 2024

(54) BREAKOUT GATEWAY CONTROL FUNCTION NUMBER MODIFICATION BASED ON SIP INVITE HEADER INFORMATION

(71) Applicant: T-Mobile USA, Inc., Bellevue, WA (US)

(72) Inventors: Jason Cataquis, Bellevue, WA (US); Dennis Romero, Mine Hill, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 317 days.

(21) Appl. No.: 17/530,367

(22) Filed: Nov. 18, 2021

(65) Prior Publication Data
US 2023/0156865 A1   May 18, 2023

(51) Int. Cl.
*H04W 80/10* (2009.01)
*H04M 7/12* (2006.01)
*H04L 65/1033* (2022.01)
*H04L 65/1104* (2022.01)
*H04L 101/385* (2022.01)

(52) U.S. Cl.
CPC ............ *H04W 80/10* (2013.01); *H04M 7/127* (2013.01); *H04L 65/1033* (2013.01); *H04L 65/1104* (2022.05); *H04L 2101/385* (2022.05)

(58) Field of Classification Search
CPC ... H04W 80/10; H04M 7/127; H04L 65/1104; H04L 2101/385; H04L 65/1033
See application file for complete search history.

(56) References Cited

U.S. PATENT DOCUMENTS

| | | |
|---|---|---|
| 5,506,897 A | 4/1996 | Moore et al. |
| 6,683,881 B1 | 1/2004 | Mijares et al. |
| 6,917,612 B2 | 7/2005 | Foti et al. |
| 6,987,781 B1 | 1/2006 | Miller et al. |
| 6,996,087 B2 | 2/2006 | Ejzak |
| 7,031,747 B2 | 4/2006 | Cyr et al. |
| 7,154,864 B2 | 12/2006 | Costa-requena et al. |
| 7,245,611 B2 | 7/2007 | Narasimhan et al. |
| 7,308,267 B2 | 12/2007 | Goering et al. |
| 7,548,743 B2 | 6/2009 | Cai et al. |
| 7,558,254 B2 | 7/2009 | Haase et al. |
| 7,580,516 B2 | 8/2009 | Long et al. |
| 7,640,036 B2 | 12/2009 | Kallio |
| 7,649,881 B2 | 1/2010 | Casey |
| 7,668,183 B2 | 2/2010 | Calme et al. |
| 7,702,342 B2 | 4/2010 | Duan |
| 7,804,820 B2 | 9/2010 | Shi et al. |
| 7,843,902 B2 | 11/2010 | Imbimbo et al. |
| 7,852,838 B2 | 12/2010 | Miller et al. |

(Continued)

FOREIGN PATENT DOCUMENTS

EP    2293512 B1    1/2016

*Primary Examiner* — Curtis B Odom
(74) *Attorney, Agent, or Firm* — Perkins Coie LLP

(57) ABSTRACT

A Breakout Gateway Control Function (BGCF) determines a geographic location information (e.g., a major trading area (MTA) information) from a SIP INVITE header information (e.g., from a P-Access-Network-Info (PANI) header information) and modifies the SIP URI in the SIP INVITE request by adding, deleting, or modifying values (e.g., prepending a number prefix to the URI) to generate a SIP URI that is based on the geographic location information.

18 Claims, 7 Drawing Sheets

(56) References Cited

U.S. PATENT DOCUMENTS

| | | |
|---|---|---|
| 7,881,288 B2 | 2/2011 | Noldus et al. |
| 7,898,990 B2 | 3/2011 | Kallio et al. |
| 7,969,967 B2 | 6/2011 | Douglas et al. |
| 7,974,295 B2 | 7/2011 | Tuohino et al. |
| 7,975,037 B2 | 7/2011 | Tai et al. |
| 7,996,007 B2 | 8/2011 | Bantukul |
| 8,036,366 B2 | 10/2011 | Chu |
| 8,050,253 B2 | 11/2011 | Kalyanpur et al. |
| 8,081,586 B2 | 12/2011 | Kiss |
| 8,086,519 B2 | 12/2011 | Mylet et al. |
| 8,130,639 B1 | 3/2012 | Robbins |
| 8,145,190 B2 | 3/2012 | Caldwell et al. |
| 8,160,559 B2 | 4/2012 | Buckley et al. |
| 8,244,905 B2 | 8/2012 | Bhatt et al. |
| 8,254,553 B2 | 8/2012 | Agarwal et al. |
| 8,254,877 B2 | 8/2012 | Edge et al. |
| 8,305,210 B2 | 11/2012 | Bakker et al. |
| 8,325,708 B2 | 12/2012 | Lim et al. |
| 8,335,221 B2 | 12/2012 | Shi |
| 8,363,572 B2 | 1/2013 | Potts et al. |
| 8,374,172 B2 | 2/2013 | Jana et al. |
| 8,423,758 B2 | 4/2013 | Singhal |
| 8,428,032 B1 | 4/2013 | Pankajakshan et al. |
| 8,446,899 B2 | 5/2013 | Lei et al. |
| 8,456,274 B2 | 6/2013 | Modiano |
| 8,472,431 B2 | 6/2013 | Siegel et al. |
| 8,520,615 B2 | 8/2013 | Mehta et al. |
| 8,543,107 B1 | 9/2013 | Bertz et al. |
| 8,582,566 B2 | 11/2013 | Bae et al. |
| 8,606,222 B2 | 12/2013 | Agarwal et al. |
| 8,615,217 B2 | 12/2013 | Ravishankar et al. |
| 8,630,651 B2 | 1/2014 | Lau |
| 8,644,301 B2 | 2/2014 | Tamhankar et al. |
| 8,700,038 B2 | 4/2014 | Wang et al. |
| 8,761,764 B2 | 6/2014 | Mccann et al. |
| 8,782,255 B2 | 7/2014 | Thiebaut et al. |
| 8,787,362 B2 | 7/2014 | Atarius et al. |
| 8,799,440 B2 | 8/2014 | Zhou et al. |
| 8,862,718 B2 | 10/2014 | Naim et al. |
| 8,886,209 B2 | 11/2014 | Shaw et al. |
| 8,898,063 B1 | 11/2014 | Sykes et al. |
| 8,942,747 B2 | 1/2015 | Marsico |
| 9,025,553 B2 | 5/2015 | Stille |
| 9,042,378 B2 | 5/2015 | Rasanen |
| 9,043,451 B2 | 5/2015 | Bantukul et al. |
| 9,071,483 B1 | 6/2015 | Mayhan |
| 9,185,139 B2 | 11/2015 | Holbrook et al. |
| 9,185,545 B2 | 11/2015 | Yeoum et al. |
| 9,215,734 B2 | 12/2015 | Bakker et al. |
| 9,264,299 B1 | 2/2016 | Palmer et al. |
| 9,288,317 B2 | 3/2016 | Siminoff |
| 9,379,898 B2 | 6/2016 | Russell et al. |
| 9,380,558 B2 | 6/2016 | Mathias et al. |
| 9,386,407 B2 | 7/2016 | Malin |
| 9,392,070 B2 | 7/2016 | Boberg et al. |
| 9,392,124 B2 | 7/2016 | Cleary et al. |
| 9,392,436 B2 | 7/2016 | Xu et al. |
| 9,402,212 B2 | 7/2016 | Mutikainen et al. |
| 9,426,299 B2 | 8/2016 | Evans |
| 9,521,015 B2 | 12/2016 | Sylvain et al. |
| 9,686,284 B2 | 6/2017 | Shah et al. |
| 9,729,705 B2 | 8/2017 | Ligeret et al. |
| 9,781,655 B2 | 10/2017 | Lee et al. |
| 9,832,234 B2 | 11/2017 | Abtin et al. |
| 9,867,090 B2 | 1/2018 | Hallenstål et al. |
| 9,924,344 B1 | 3/2018 | Datar |
| 10,027,719 B2 | 7/2018 | Österlund et al. |
| 10,028,175 B2 | 7/2018 | Sharma et al. |
| 10,044,769 B2 | 8/2018 | Mufti et al. |
| 10,055,791 B2 | 8/2018 | Baker |
| 10,135,880 B2 | 11/2018 | Bonkowski |
| 10,148,703 B2 | 12/2018 | Mufti et al. |
| 10,341,396 B2 | 7/2019 | Kumar Selvaraj |
| 10,375,127 B2 | 8/2019 | Filart |
| 10,455,453 B2 | 10/2019 | Mufti et al. |
| 10,560,570 B2 | 2/2020 | Bot et al. |
| 10,827,017 B2 | 11/2020 | Alam |
| 10,863,025 B2 | 12/2020 | Filart |
| 10,863,034 B2 | 12/2020 | Bianco et al. |
| 2004/0072593 A1 | 4/2004 | Robbins et al. |
| 2004/0255137 A1 | 12/2004 | Ying |
| 2006/0234703 A1 | 10/2006 | Wuthnow et al. |
| 2006/0248586 A1 | 11/2006 | Delaney et al. |
| 2007/0238472 A1 | 10/2007 | Wanless |
| 2007/0258575 A1 | 11/2007 | Douglas et al. |
| 2008/0032695 A1 | 2/2008 | Zhu et al. |
| 2008/0137643 A1 | 6/2008 | Khanchandani et al. |
| 2008/0267169 A1 | 10/2008 | Mundra et al. |
| 2009/0041223 A1 | 2/2009 | Agarwal et al. |
| 2009/0047922 A1 | 2/2009 | Buckley et al. |
| 2010/0050234 A1 | 2/2010 | Lindholm et al. |
| 2010/0157986 A1 | 6/2010 | Rao et al. |
| 2010/0232403 A1 | 9/2010 | Qiu et al. |
| 2011/0026510 A1 | 2/2011 | Matsumura et al. |
| 2011/0161505 A1 | 6/2011 | Siegel et al. |
| 2011/0249666 A1* | 10/2011 | Holbrook ............... H04L 69/22 370/352 |
| 2011/0310884 A1 | 12/2011 | Arauz-rosado |
| 2012/0157094 A1 | 6/2012 | Cheng et al. |
| 2013/0250942 A1 | 9/2013 | Khan et al. |
| 2016/0248814 A1 | 8/2016 | Mufti et al. |
| 2017/0164144 A1 | 6/2017 | Panchabhai et al. |
| 2017/0244663 A1 | 8/2017 | Ku et al. |
| 2017/0366961 A1 | 12/2017 | Sabeur |
| 2017/0374195 A1 | 12/2017 | Siminoff |
| 2018/0337851 A1 | 11/2018 | Smithson et al. |
| 2018/0343343 A1 | 11/2018 | Filart |
| 2019/0068785 A1 | 2/2019 | Cañas et al. |
| 2019/0116268 A1 | 4/2019 | Li et al. |
| 2019/0364101 A1 | 11/2019 | Ramakrishnan et al. |
| 2019/0379711 A1 | 12/2019 | Sood et al. |
| 2020/0045168 A1 | 2/2020 | Sinha |
| 2020/0092688 A1 | 3/2020 | Piscopo et al. |
| 2020/0146080 A1 | 5/2020 | Bot et al. |
| 2020/0175590 A1 | 6/2020 | Huo |
| 2021/0029659 A1 | 1/2021 | Rahman et al. |
| 2021/0051530 A1 | 2/2021 | Venkataraman et al. |
| 2021/0160666 A1 | 5/2021 | Zaifuddin |
| 2021/0182807 A1 | 6/2021 | Akuon et al. |
| 2022/0141260 A1 | 5/2022 | Yao |
| 2023/0012008 A1 | 1/2023 | Li et al. |

* cited by examiner

BREAKOUT GATEWAY CONTROL FUNCTION NUMBER MODIFICATION BASED ON SIP INVITE HEADER INFORMATION

BACKGROUND

Historically, mobile phones have provided voice call services to users over a circuit-switched-style network, such as the public switched telephone network (PSTN), rather than over an IP packet-switched network. To enable delivery of IP multimedia services, the IP Multimedia Subsystem or IP Multimedia Core Network Subsystem (IMS) was introduced as an architectural framework. The IMS uses the Session Initiation Protocol (SIP), a signaling protocol, to initiate, maintain, and terminate real-time sessions that include voice, video and messaging applications. The SIP is used for signaling and controlling multimedia communication sessions in applications of Internet telephony for voice and video calls, in private IP telephone systems, in instant messaging over IP networks as well as voice calling over Long-Term Evolution (VoLTE) or New Radio (VoNR).

IMS terminals such as mobile phones and other user equipment (UEs) can register directly on IMS to make calls, even when they are roaming in another network or country. The calls are routed across a network of switching systems, sometimes owned by different network operators.

BRIEF DESCRIPTION OF THE DRAWINGS

Detailed descriptions of implementations of the present invention will be described and explained using the accompanying drawings.

Figure 1:
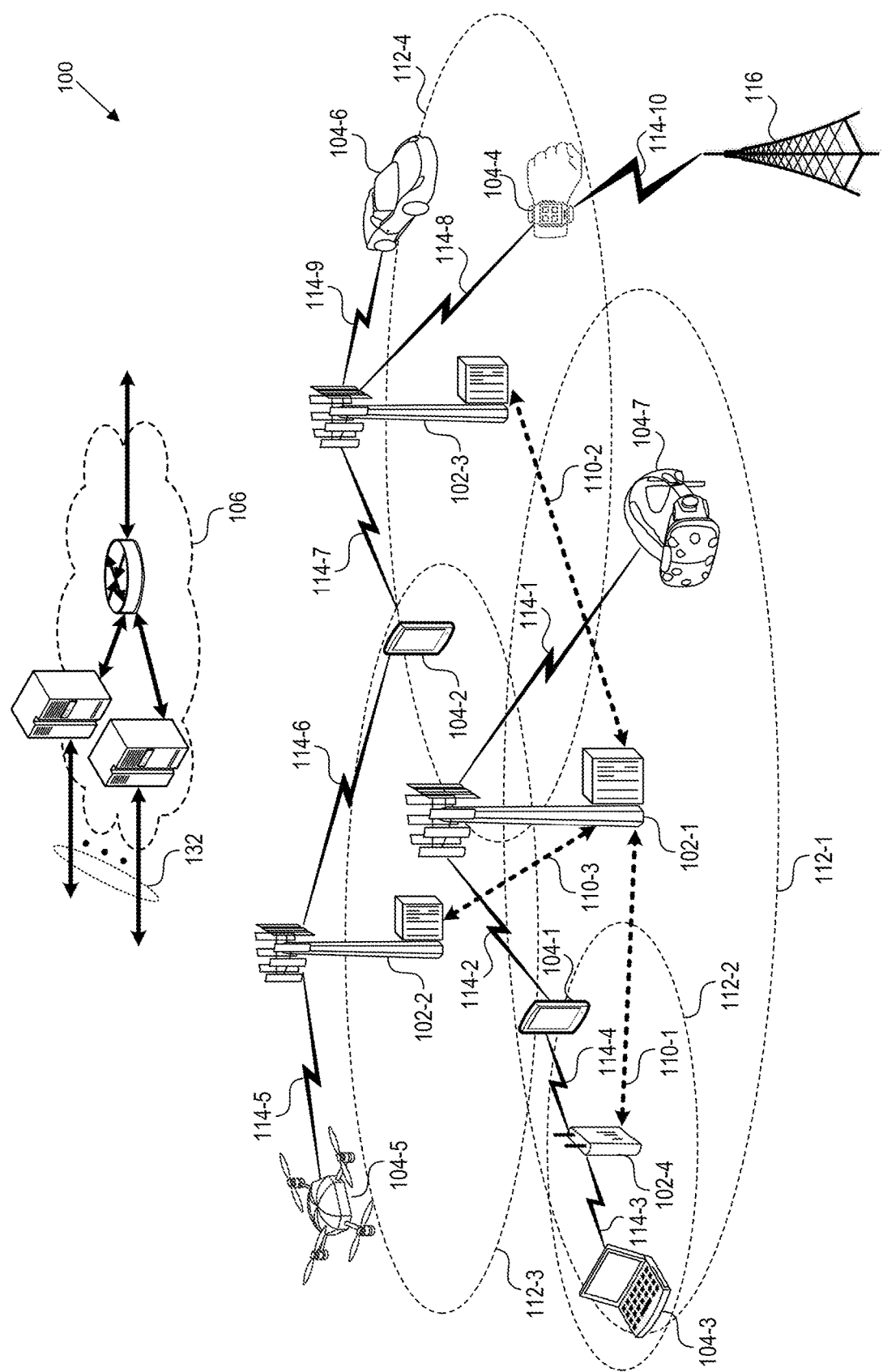
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In one aspect of the disclosed technology, a Breakout Gateway Control Function (BGCF) determines a geographic location information (e.g., a major trading area (MTA)) from a SIP INVITE header information (e.g., from a P-Access-Network-Info (PANI) header information). The BGCF modifies the SIP URI in the SIP INVITE request by adding, deleting, or modifying values (e.g., prepending a number prefix) to generate a SIP URI that is based on the geographic location information. For example, for two SIP INVITES from two users dialing the same telephone number (e.g., the same toll-free number) from different geographic locations, the BGCF modifies the SIP URIs to provide two different SIP URIs with different prefixes that are based on the user locations. The two SIP URIs are routed to different destinations based on the caller's location. This allows different callers to use the same dialing number (e.g., the same 1-800 toll-free number or the same 411 directory-assistance number) to reach different destinations where each destination corresponds to the caller's location (e.g., a caller reaches the destination better suited to handle the caller's inquiries).

In another aspect of the disclosed technology, the BGCF sends the modified SIP URIs to an Interconnect Session Border Controller (ISBC) without traversing any intermediate network nodes or functions and/or without any intervening processing of the modified SIP URI that would further modify the SIP INVITE URIs.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over an LTE/LTE-A communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Internet Protocol (IP) Multimedia Subsystem

Figure 2:
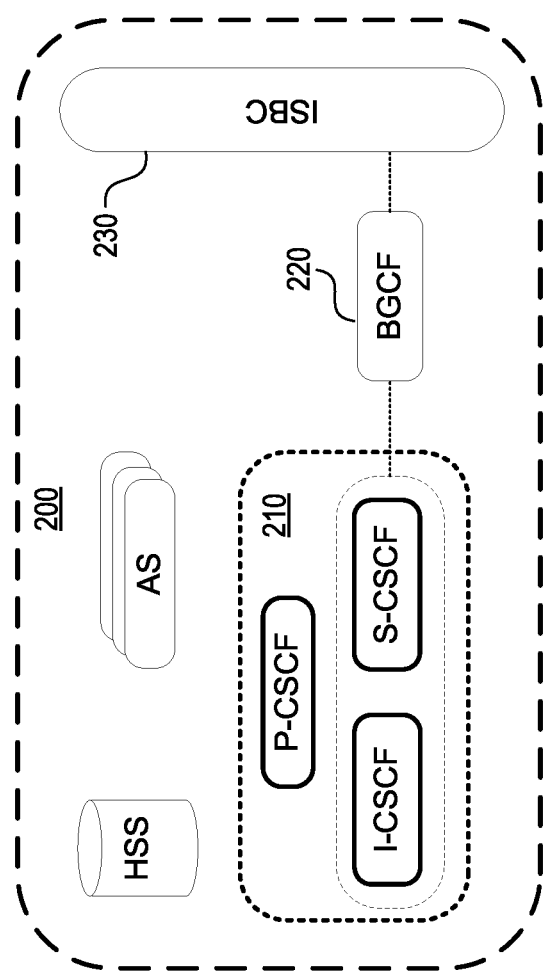
FIG. 2 illustrates an example architecture of an Internet Protocol (IP) Multimedia Subsystem (IMS) in which aspects of the present invention can operate.

FIG. 2 illustrates an example functional architecture of an IMS 200. Some of the network functions provided by the IMS include:

1. Call Session Control Function (CSCF) 210.

1a. A Proxy-CSCF (P-CSCF) is a SIP proxy that is the first point of contact for the IMS terminal.

1b. An Interrogating-CSCF (I-CSCF) is another SIP function located at the edge of an administrative domain. Its IP address is published in the Domain Name System (DNS) of the domain so that remote servers can find it, and use it as a forwarding point (e.g., registering) for SIP packets to this domain.

1c. A Serving-CSCF (S-CSCF) is the central node of the signaling plane.

2. A Breakout Gateway Control Function (BGCF) 220.

The BGCF is a SIP proxy that processes requests for routing from a Serving-Call Session Control Function (S-CSCF) when the S-CSCF has determined that the session cannot be routed using DNS or Electronic Numbering (ENUM) lookups (ENUM)/DNS. It includes routing functionality based on telephone numbers. The BGCF is used to select the network where the public switched telephone network (PSTN) connection is going to be made.

3. An Interconnect Session Border Controller (ISBC) 230.

The ISBC (also abbreviated I-SBC) manages in-coming and out-going traffic from and to the IMS domain and protects the IMS from external attack. The ISBC addresses the boundary requirements at the point that service provider networks interconnect and exchange inbound and outbound SIP sessions. The ISBC integrates three IMS functional elements: Interconnect Border Control Function (IBCF), Inter-Working Function (IWF), and Transition Gateway (TrGW).

For a call or message originated from the IMS core, a User Equipment (UE) routes the call or message to CSCF, where the CSCF sends a query to the ENUM/DNS database. If the query to ENUM/DNS database is not successful (e.g., the ENUM/DNS database is not provisioned with the extension information, and/or the destination address is not defined), the SIP call or message is routed to BGCF so that routing can be performed based on telephone numbers.

BGCF Number Modification

The disclosed technology improves upon prior BGCFs by enabling the BGCF to perform number modification in the IMS domain instead of routing the IMS calls to a legacy mobile switching center (MSC) for the MSC to perform any required translations. The disclosed BGCF manipulates the SIP uniform resource identifier (URI) by deleting, adding, or modifying digits in the SIP INVITE URI. In contrast, prior BGCFs (e.g., BGCF 220 in FIG. 2) route all SIP INVITES with, for example, the same dialed area code and prefix (or the same telephone number), to the same destination, e.g., to the same MSC. The MSC then performs the number translation to route to the appropriate destination. References to BGCF throughout this description can refer to the functions performed by the BGCF or to the network node or element or hardware implementing the functions performed by the BGCF.

There are several instances where, although two users in two different geographic locations dial the same telephone number, they intend to be connected to local services specific to the geographic area they are calling from. For example, two users in different states dialing a toll-free (e.g., 1-800) number to a nation-wide store might desire to obtain information pertinent to the stores in their state and thus may desire to connect to a target destination associated with their calling location. The BGCF is designed to manage number analysis breakout and is the nearest network element that is connected to the ISBC and then to peering partners. Consequently, by performing number modification at the BGCF, the disclosed technology improves (e.g., reduces) network latency (by removing one hop), and also allows the outdated and expensive MSCs to be retired, among other benefits.

Figure 3:
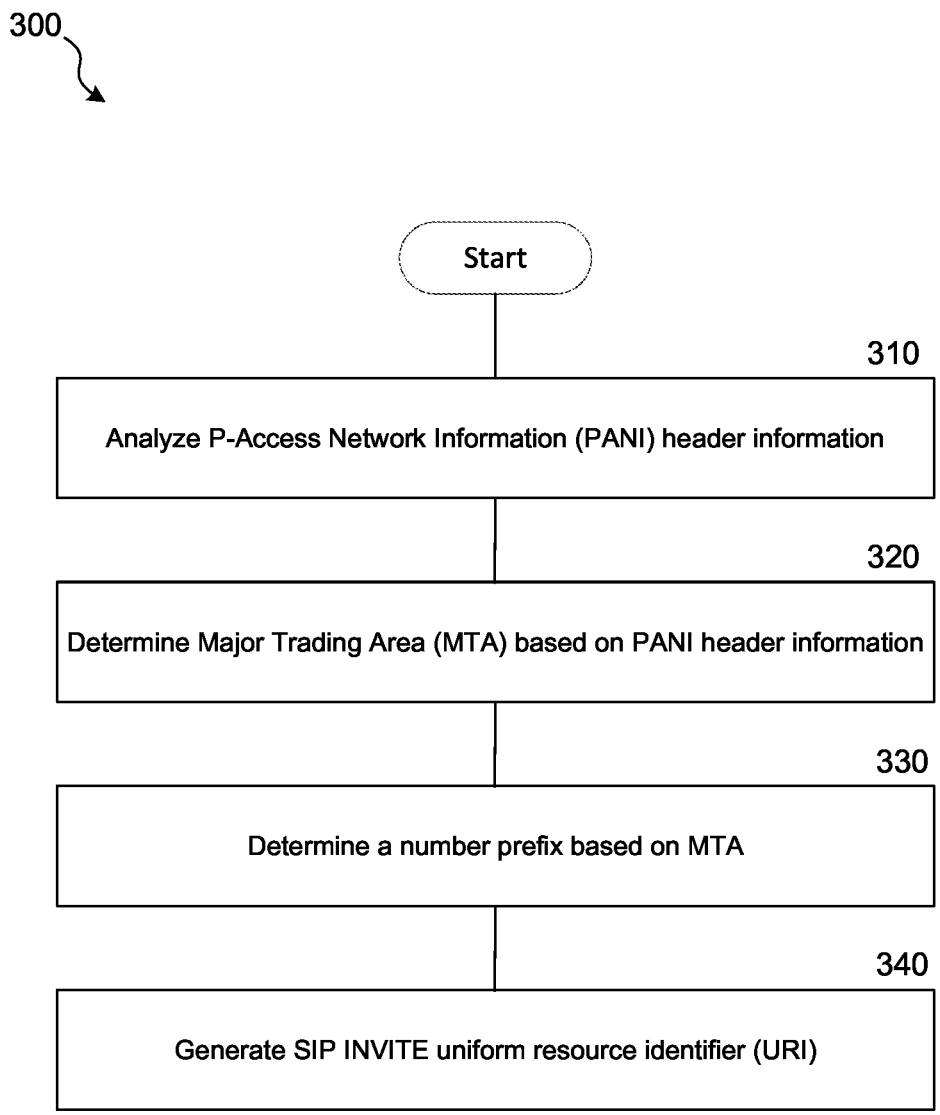
FIG. 3 is a flowchart that illustrates a process for generating a SIP INVITE URI based on a P-Access-Network-Info (PANI) header information.

FIG. 3 is a flowchart that illustrates a process 300 for generating a SIP INVITE URI based on a P-Access-Network-Info (PANI) header information. At block 310, the BGCF determines or analyzes PANI header information. The PANI header is a 3GPP-specific header that indicates to the IMS network, inter-alia, over which access technology and cell the UE is attached to in IMS.

For example, an E-UTRAN (LTE) PANI header, includes an access-type field that can be "3GPP-E-UTRAN-FDD" for FDD access or "3GPP-E-UTRAN-TDD" for TDD access. The PANI header also includes a cell identifier parameter, "utran-cell-id-3gpp," which is coded as a text string concatenation of the mobile country code (MCC), mobile network code (MNC), tracking area code (TAC), and the cell-identity value obtained from lower layers of the UE. In 5G new radio (NR), the primary-access-network-info (PANI) contains access parameters as "3GPP-NR-FDD" or "3GPP-NR-TDD," with cell identifier parameters MCC, MNC, TAC, and NR Cell Identity (NCI).

Each LTE/NR cell site and each tracking area in the LTE/NR radio access networks (RAN) has a unique PANI header.

Figure 4:
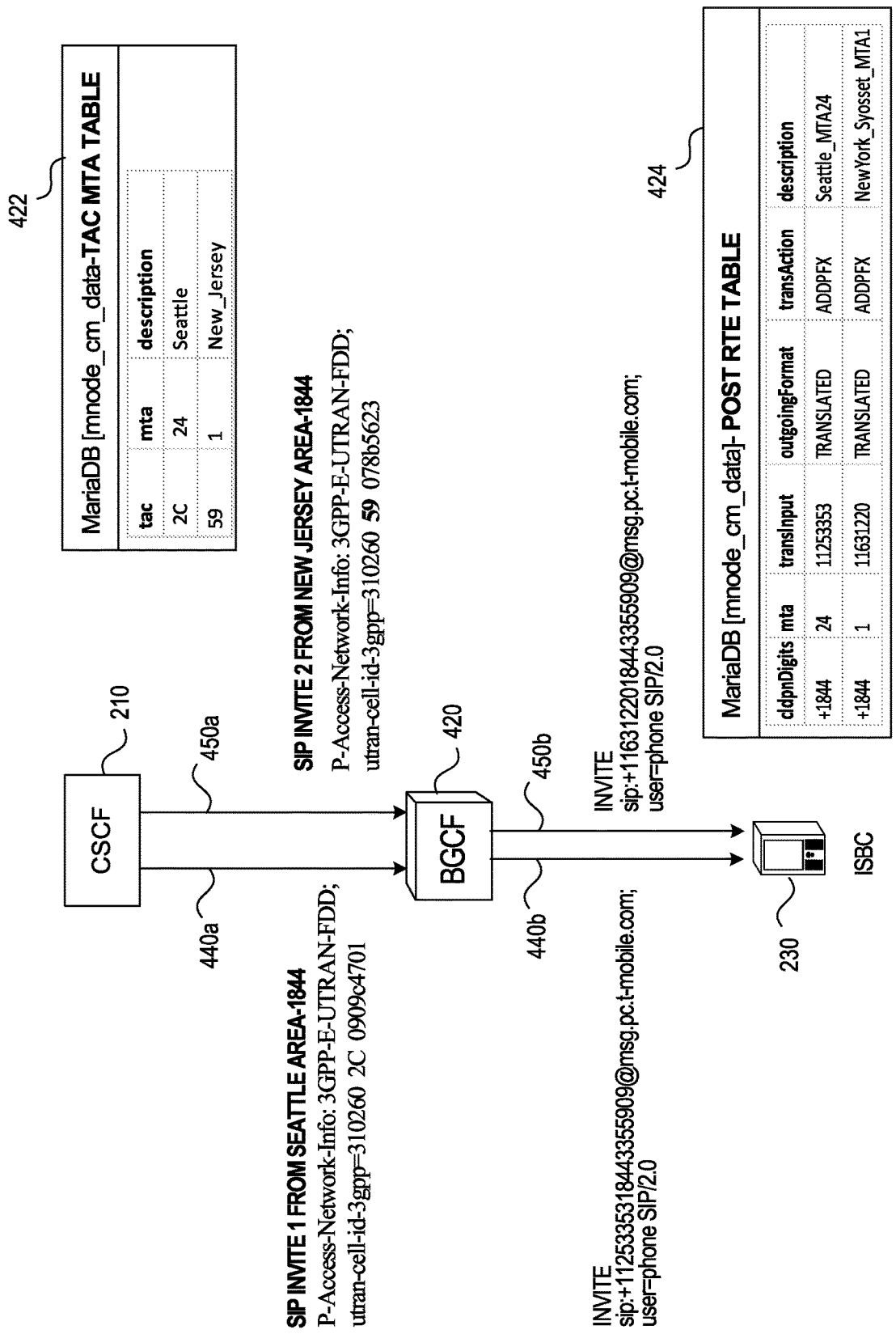
FIG. 4 is a block diagram that illustrates an example toll free number modification.

For example, turning to FIG. 4 which is a block diagram that illustrates an example toll free number modification, two SIP INVITES are shown: SIP INVITE 1 440a, and SIP INVITE 2 450a. The two SIP INVITES have two different PANI headers:

SIP INVITE #1 PANI=3GPP-E-UTRAN-FDD;utran-cell-id-3gpp=3102602C0909c4701

SIP INVITE #2 PANI=3GPP-E-UTRAN-FDD;utran-cell-id-3gpp=31026059078b5623

Turning back to FIG. 3, at block 320, the BGCF determines a Major Trading Area (MTA) value based on the PANI header information.

For example, the BGCF 420 in FIG. 4 can include a TAC-MTA lookup table 422 that associates different TAC values to different MTA values. For example, SIP INVITE #1 PANI header includes a TAC value with hexadecimal digits "2C" which the TAC-MTA table 422 associates with an MTA value of 24 corresponding to Seattle; SIP INVITE #2 PANI header includes a TAC value with hexadecimal digits "59" which the TAC-MTA table 422 associates with an MTA value of 1 corresponding to New Jersey.

In some implementations, BGCF 420 includes different lookup tables, databases, or other stored pre-determined or dynamically generated translation functions to translate PANI information indicative of geographic location (e.g., TAC and cell-id information) to an MTA value or other value indicative of geographic location of the calling UE, and then to number prefixes to be used in the modified SIP request URI (R-URI). For example, determining the number prefix associated with the geographic location information to be used in the modified R-URI can include first querying a first database (e.g., TAC-MTA table 422) that associates different TAC values to corresponding MTA values to determine an MTA value corresponding to the PANI header. Once the MTA value is obtained, the BGCF can then query a second database that associates different MTA values to corresponding number prefixes (e.g., POST RTE Table 424) to determine the number prefix associated with the geographic location information to use in the modified R-URI.

At block 330, the BGCF determines a number prefix based on and associated with the MTA value.

For example, for the SIP INVITE #1 corresponding to a Seattle MTA of 24, the BGCF 420 determines a number prefix "11253353" and for the SIP INVITE #2 corresponding to the New Jersey MTA of 1, the BGCF determines a number prefix "11631220".

At block 340, the BGCF generates or modifies a SIP INVITE uniform resource identifier (URI) based on the number prefix.

For example, for the SIP INVITE #1, the BGCF 420 generates a SIP INVITE URI 440b that includes the number prefix "11253353" and for the SIP INVITE #2, the BGCF generates a SIP INVITE URI 450b that includes the number prefix 11631220".

In some implementations, the SIP INVITE URIs modified by the BGCF 420 as described above are sent to the ISBC 230 or to other BGCFs in other networks (not shown in FIG. 4) directly without any intermediate network nodes or additional processing of or modification to the modified SIP URI (e.g., without further adding, deleting, or modifying digits in the SIP INVITE URIs). Consequently, no additional third-party hardware between the BGCF and the ISBC (e.g., the legacy ISBC 230 of FIG. 2) is required for SIP URI processing. Such additional hardware, if needed, can add to the cost of the call routing implementation, can add to the network latency, and can add additional failure nodes or points, among other disadvantages.

FIG. 4 shows an extracted data view 424 of statically generated data from a Post Router (POST RTE) Table or database (DB). The data view 424 shows how the BGCF 420 modifies the SIP INVITE URIs for SIP INVITE #1 and SIP INVITE #2 to provide SIP INVITE URIs to the ISBC 230 that include location-based prefixes (e.g., BGCF 420 prepends a location-based number prefix to an initial/unmodified SIP URI that it receives from the CSCF).

For example, when users at two different geographic locations, one in Seattle (SIP INVITE #1, 440a) and another in New Jersey (SIP INVITE #2, 450a), both dial the same toll-free number "+18443355909," the BGCF 420 adds or prepends a prefix "11253353" to the SIP URI corresponding to the Seattle user and prepends a prefix "11631220" to the SIP URI corresponding to the New Jersey user. The ISBC 230 sends the call to a toll-free provider, where the toll-free provider routes to the correct destination based on the prefixes. Without the number modification in the disclosed technology, unmodified SIP URIs from a legacy BGCF would have the prefix +1844 and would be routed to the same MSC. The MSC would then perform the translation to route it to the correct geographic-based destination. The disclosed technology thereby allows the network operator to eliminate the use of legacy MSCs for number modification.

Update to the radio access network (RAN), e.g., adding or removing cells or tracking areas, can require updates to the translation tables in the BGCF 420 (e.g., updates to the TAC-MTA Table 422 and/or to the POST RTE Table 424).

Figure 5:
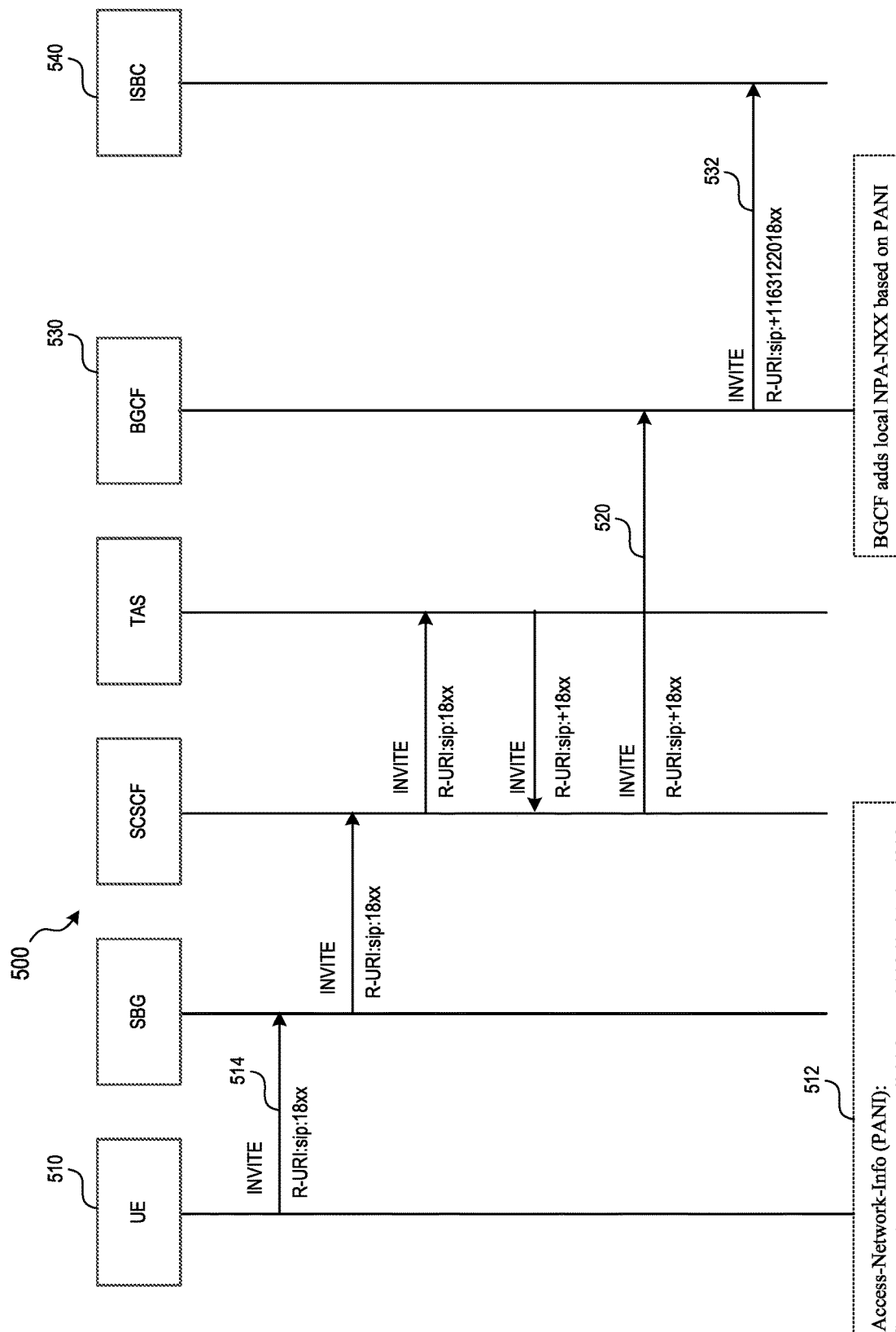
FIG. 5 is a flow diagram that illustrates number modification for an IMS-originated toll-free call.

FIG. 5 is a flow diagram 500 that illustrates number modification for an IMS-based toll-free telephone call. For example, a user equipment (UE) 510 initiates an IMS call and sends a SIP INVITE request 514 to a Session Border Gateway (SBG). The SIP INVITE 514 includes a request-URI (R-URI) of "sip:18xx" ("18xx" corresponds to a toll free 1-800, 1-833, 1-844, etc., number).

The SIP INVITE request 514 includes a PANI header 512 with a utran-cell-id-3gpp value that is based on the location of the cell that the UE is attached to (e.g., the uttran-cell-id-3gpp corresponds to an MTA value as described above in relation to FIGS. 3 and 4). For example, as shown in FIG. 5, the SIP INVITE has an example PANI header of "3GPP-E-UTRAN-FDD;utran-cell-id-3gpp=310260591e0ac4303" that includes a TAC hex value of "59" which corresponds to a New Jersey MTA.

The SBG forwards the SIP INVITE to the S-CSCF (SCSCF) which forwards it to a telephony application server (TAS). Based on a response from the TAS, the SCSCF sends a SIP INVITE 520 to a BGCF 530. The SIP INVITE 520 includes an R-URI that includes the toll-free number dialed by the UE 510.

The BGCF 530 modifies the R-URI and sends a SIP INVITE 532 to an ISBC 540 (or to other BGCFs in other networks). The SIP INVITE 532 includes a modified R-URI. For example, the BGCF 530 adds steering digits to the dialed toll-free number based on the location of the caller. The caller location is derived from the PANI header (e.g., from the TAC and/or cell-id information in the PANI). As shown in FIG. 5, the BGCF 530 can add local numbering plan area (NPA) (e.g., area code) and central office code (NXX) (e.g., prefix) to the R-URI where the NPA/NXX depends on the PANI information 512. Consequently, as shown in the example of FIG. 5, if the user dialed a 18xx toll-free number (e.g., 1-833-454-7878) from a cell site in New Jersey, the BGCF can prepend "11631220" to the 18xx R-URI resulting in a modified R-URI of "sip:+1163122018334547878." If a different user dialed the same 18xx toll-free number from a different location (e.g., from a different state), the BGCF 530 can prepend a different prefix to the 18xx R-URI such that the two users, although dialing the same toll-free number, will be routed to different destinations.

Figure 6:
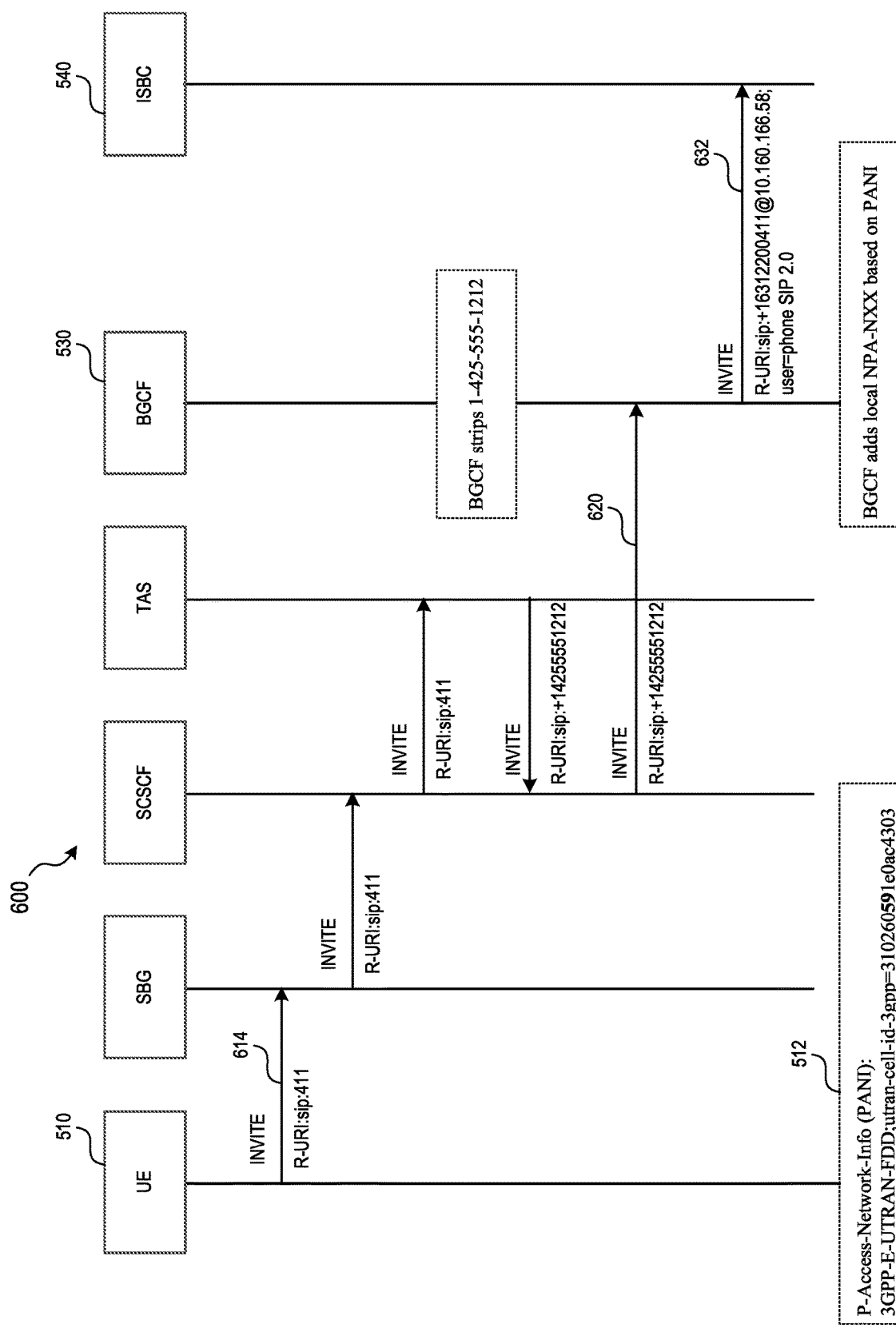
FIG. 6 is a flow diagram that illustrates number modification for an IMS-originated directory assistance call.

FIG. 6 is a flow diagram 600 that illustrates number modification for an IMS-based directory-assistance telephone call. In the example of FIG. 6, the UE 510 initiates an IMS directory-assistance call and sends a SIP INVITE request 614 to the SBG. The SIP INVITE 614 includes an R-URI of "sip:411" corresponding to a dialed directory assistance number of 411.

The SBG forwards the SIP INVITE to the SCSCF which forwards it to the TAS which translate the 411 number to, for example, a local or national directory assistance 10-digit code (e.g., +1-425-555-1212).

The SCSCF sends a SIP INVITE 620 with an R-URI including the 10-digit directory assistance number (e.g., "sip:+14255551212") to the BGCF 530.

In some implementations, the BGCF 530 strips out the 10-digit directory-assistance number that can be used by all callers dialing 411 regardless of where the callers are located, and replaces it with a 10-digit directory-assistance number that corresponds to the geographic location the caller is calling from. For example, the BGCF 530 can determine from the PANI header 512 TAC hex value that the directory assistance caller is calling from New Jersey. The BGCF 530 can then replace the 10-digit code in the R-URI +14255551212 with a 10-digit code (e.g., "+16312200411") that is specific to New Jersey. By stripping digits from the initial URI and adding local NPA/NXX information based on the PANI, the BGCF generated/modified R-URI can be used to route the SIP request to the appropriate destination without relying on MSC translation (or without relying on translation by any node or function between the BGCF 530 and ISBC 540).

In some implementations, the BGCF replaces one or more digits of the initial SIP URI received by the BGCF 530 with one or more digits of the number prefix associated with the PANI header 512.

It will be appreciated that although the example implementation above has used the 411 directory assistance number, other special short-code numbers are equally applicable such as 811 (national call-before-you-dig phone number), 611 (to report a problem with telephone service), other N11 special services numbers, etc.

In one example implementation, for an E911 call coming from an emergency CSCF (E-CSCF), if the SIP R-URI includes steering digits in front of the Emergency Service Routing Number (ESRN), the BGF 530 can manipulate the R-URI to remove the steering digits before sending the SIP INVITE to the ISBC 540.

In another example implementation, the BGCF 530 can be used for SIP routing testing. For example, the TAS can include steering digits in front of the dialed number. When the BGCF 530 receives the SIP INVITE, it can alter the SIP URI by deleting the steering digits and routing the call to the desired SIP route.

In another example implementation, the TAS can include steering digits in front of the Mobile Subscriber Roaming Number (MSRN). When the BGCF 530 receives the SIP INVITE, it can alter the SIP URI by deleting the steering digits and routing the call to the desired SIP route.

In another example implementations, if a user dials a poison control center number, the BGCF 530 can add steering digit(s) based on the location of the caller so that once the call reaches the network operator, the operator can determine that the call is coming from the correct geographic area.

Computer System

Figure 7:
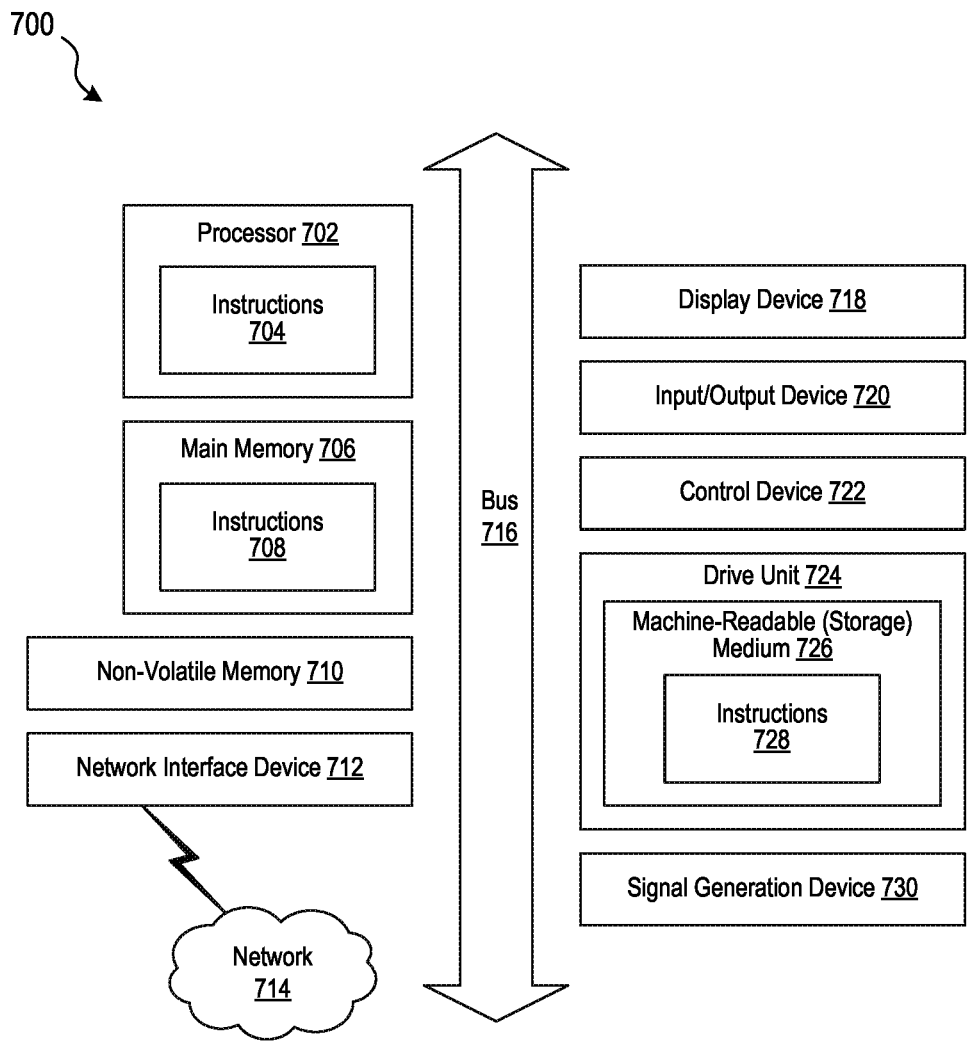
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and the assignee's concurrently filed U.S. patent application Ser. No. 17/530,353, filed Nov. 18, 2021, and entitled CROSS-DOMAIN ROUTING BASED ON SESSION INITIATION PROTOCOL INFORMATION, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. At least one computer-readable storage medium, excluding transitory signals and carrying instructions, which, when executed by at least one data processor of a system, cause the system to:
   determine a SIP INVITE header information,
      wherein the SIP INVITE header information comprises a P-Access-Network-Info (PANI) header information,
         wherein the PANI header information comprises a text string concatenation of a mobile country code (MCC), a mobile network code (MNC), a tracking area code (TAC), and a cell-identity value;
   determine a geographic location information based on the PANI header information,
      wherein the geographic location information comprises a major trading area (MTA) information;
   determine a number prefix associated with the geographic location information; and
   generate a SIP INVITE request uniform resource identifier (R-URI) based on the number prefix.

2. The at least one computer-readable storage medium of claim 1, wherein the system is further caused to:
   send the generated SIP INVITE R-URI to an Interconnect Session Border Controller (ISBC) without subsequently modifying the R-URI.

3. The at least one computer-readable storage medium of claim 1, wherein the SIP INVITE corresponds to a toll-free call, an E911 call, a directory assistance call, or a call to a poison control center.

4. The at least one computer-readable storage medium of claim 1, wherein the system comprises a Breakout Gateway Control Function (BGCF), and wherein the BGCF is configured to perform at least some of the instructions carried by the storage medium.

5. The at least one computer-readable storage medium of claim 1, wherein the SIP INVITE corresponds to a voice over Long-Term Evolution (VoLTE) call or a voice over New Radio (VoNR) call.

6. The at least one computer-readable storage medium of claim 1, wherein determining the number prefix associated with the geographic location information comprises querying a first database that associates different TAC values to corresponding MTA values to determine an MTA value corresponding to the PANI header, and querying a second database that associates different MTA values to corresponding number prefixes to determine the number prefix associated with the MTA value.

7. A method comprising:
analyzing a SIP INVITE header information;
determining a geographic location information based on the SIP INVITE header information,
wherein the geographic location information comprises a major trading area (MTA) information;
determining a number prefix associated with the geographic location information; and
generating or modifying a SIP INVITE uniform resource identifier (URI) based on the number prefix.

8. The method of claim 7, wherein the SIP INVITE header information comprises a P-Access-Network-Info (PANI) header information.

9. The method of claim 7, wherein determining the geographic location information based on the SIP INVITE header information comprises:
determining a tracking area code (TAC) or a cell-identity value corresponding to the SIP INVITE header information; and
determining the geographic location information based on the TAC or the cell-identity value.

10. The method of claim 7, wherein generating or modifying the SIP INVITE URI based on the number prefix comprises prepending the number prefix to an initial SIP URI received by a Breakout Gateway Control Function (BGCF), or replacing one or more digits from the initial SIP URI with one or more digits of the number prefix.

11. The method of claim 7, further comprising sending the SIP INVITE URI to an Interconnect Session Border Controller (ISBC) without further modifying the SIP INVITE URI.

12. The method of claim 7, wherein the SIP INVITE corresponds to a toll-free call, an E911 call, or a directory assistance call.

13. A Breakout Gateway Control Function (BGCF) comprising:
at least one hardware processor; and
at least one non-transitory memory, coupled to the at least one hardware processor and storing instructions, which, when executed by the at least one hardware processor, cause the BGCF to:
analyze a SIP INVITE header information received from a Serving Call Session Control Function (S-CSCF);
determine a geographic location information associated with the SIP INVITE header information,
wherein the geographic location information comprises a major trading area (MTA) information;
determine a number prefix associated with the geographic location information;
generate or modify a SIP INVITE uniform resource identifier (URI) based on the number prefix; and
send the SIP INVITE URI to an Interconnect Session Border Controller (ISBC) or to one or more BGCFs.

14. The BGCF of claim 13, wherein the SIP INVITE header information comprises a P-Access-Network-Info (PANI) header information.

15. The BGCF of claim 13, wherein determining the geographic location information based on the SIP INVITE header information comprises:
determining a tracking area code (TAC) or a cell-identity value corresponding to the SIP INVITE header information; and
determining the geographic location information based on the TAC or the cell-identity value.

16. The BGCF of claim 13, wherein generating or modifying the SIP INVITE URI based on the number prefix comprises prepending the number prefix to an initial SIP URI received by the BGCF or replacing one or more digits from the initial SIP URI with one or more digits of the number prefix.

17. The BGCF of claim 13, wherein sending the SIP INVITE URI to the ISBC or to the one or more BGCFs comprises sending the SIP INVITE URI to the ISBC or the one or more BGCFs without further modifying the SIP INVITE URI.

18. The BGCF of claim 13, wherein the SIP INVITE corresponds to a toll-free call or a special short-code call.

\* \* \* \* \*